United States Patent
Schultz

(10) Patent No.: US 8,376,548 B2
(45) Date of Patent: Feb. 19, 2013

(54) NEAR-EYE DISPLAY WITH ON-AXIS SYMMETRY

(75) Inventor: Robert J. Schultz, Farmington, NY (US)

(73) Assignee: Vuzix Corporation, Rochester, NY (US)

( * ) Notice: Subject to any disclaimer, the term of this patent is extended or adjusted under 35 U.S.C. 154(b) by 329 days.

(21) Appl. No.: 12/887,572

(22) Filed: Sep. 22, 2010

(65) Prior Publication Data

US 2012/0069413 A1 Mar. 22, 2012

(51) Int. Cl.
- *G03B 21/14* (2006.01)
- *G03B 21/28* (2006.01)
- *G02B 5/32* (2006.01)
- *G02B 27/22* (2006.01)
- *G03H 1/26* (2006.01)
- *G02F 1/03* (2006.01)
- *G02F 1/07* (2006.01)
- *G02F 1/1335* (2006.01)

(52) U.S. Cl. ............ 353/10; 353/20; 353/98; 329/15; 329/13; 329/22; 329/247; 329/479; 349/11

(58) Field of Classification Search ............ 353/10, 353/20, 98–99; 359/15, 13, 22, 247, 479; 349/11
See application file for complete search history.

(56) References Cited

U.S. PATENT DOCUMENTS

| | | | |
|---|---|---|---|
| 5,646,783 A | 7/1997 | Banbury | |
| 5,984,477 A | 11/1999 | Weissman et al. | |
| 5,991,087 A | 11/1999 | Rallison | |
| 6,091,546 A | 7/2000 | Spitzer | |
| 6,133,944 A | 10/2000 | Braun et al. | |
| 6,144,476 A | 11/2000 | Tanijiri et al. | |
| 6,304,386 B1 | 10/2001 | Potin | |
| 6,307,526 B1 | 10/2001 | Mann | |
| 6,349,001 B1 | 2/2002 | Spitzer | |
| 6,359,723 B1 | 3/2002 | Handschy et al. | |
| 6,364,490 B1 | 4/2002 | Krause | |
| 6,369,952 B1 | 4/2002 | Rallison et al. | |
| 6,433,759 B1 | 8/2002 | Richardson et al. | |
| 6,710,928 B2 | 3/2004 | Roest | |
| 6,844,980 B2 | 1/2005 | He et al. | |
| 6,906,836 B2 | 6/2005 | Parker et al. | |
| 6,935,747 B2 | 8/2005 | Westort et al. | |
| 7,133,207 B2 | 11/2006 | Travers | |
| 7,369,317 B2 | 5/2008 | Li et al. | |
| 7,675,684 B1 | 3/2010 | Weissman et al. | |
| 2002/0085843 A1 | 7/2002 | Mann | |
| 2004/0104935 A1 | 6/2004 | Williamson et al. | |
| 2008/0081982 A1 | 4/2008 | Simon et al. | |
| 2008/0088529 A1 | 4/2008 | Tang | |
| 2008/0088936 A1 | 4/2008 | Tang et al. | |
| 2009/0051879 A1 | 2/2009 | Vitale et al. | |

*Primary Examiner* — Georgia Y Epps
*Assistant Examiner* — Magda Cruz
(74) *Attorney, Agent, or Firm* — Stephen B. Salai, Esq.; Thomas B. Ryan, Patent Agent; Harter Secrest & Emery LLP

(57) ABSTRACT

A near-eye display projects virtual images from an image generator to an eyebox within which the virtual images can be seen by a viewer. A first optical path conveys image-bearing light from the image generator to a selectively reflective powered optic and a second optical path conveys the image-bearing light along a line of sight from the selectively reflective powered optic to the eyebox. First and second selectively reflective surfaces fold the first optical path with respect to the second optical path to locate the image generator out of the line of sight to the eyebox. The image generator is effectively inclined to the line of sight to the eyebox for reducing a thickness of the near-eye display. The selectively reflective powered optic is oriented normal to local overlapping portions of the first and second optical paths at the selectively reflective powered optic.

40 Claims, 3 Drawing Sheets

NEAR-EYE DISPLAY WITH ON-AXIS SYMMETRY

TECHNICAL FIELD

Near-eye displays, which include helmet-mounted, head-mounted, and video eyewear displays, project virtual images generated by microdisplay engines into viewers' eyes. Augmented reality near-eye displays incorporate computer vision systems and project virtual computer-generated imagery atop see-through views of the ambient environment.

BACKGROUND OF THE INVENTION

Near-eye displays, particularly those that also provide see-through views of the ambient environment, incorporate powered optics for forming virtual images without unduly obstructing views of the ambient environment. Some such displays fold light paths to the powered optics out of the line of sight to the ambient environment and in others, the powered optics are at least partially transparent to light from the ambient environment.

The powered optics folded out of the line of sight generally add to another dimension of the displays, particularly to the thickness of the displays. Such additional thickness is often undesirable. Near-eye displays are generally formed as thin as possible to more closely replicate the styles of other eyewear.

The powered optics that are located along the line of sight are at least partially transmissive to ambient light but are generally oriented off axis to improve overall light efficiency and to reduce thickness requirements of other display optics for directing image-bearing light to the powered optics. The focusing power of the powered optics is expressed under reflection. To preserve a natural view of the ambient environment, either an additional optic is required to undo the focusing power under transmission or the powered optic is formed as a holographic optical element that transmits ambient light largely undisturbed. The off-axis orientation of the in-line powered optics often requires corrections for both image distortion and chromatic aberration.

SUMMARY OF THE INVENTION

The invention among it preferred embodiments, features a near-eye display with a selectively reflective powered optic (also meant to be selectively transmissive as well) oriented nominally normal to a line of sight to the ambient environment. Optical paths to and from the selectively reflective powered optic effectively overlap. That is, although the optical path to the selectively reflective powered optic is folded to locate an image generator out of the line of sight, the image generator and the selectively reflective powered optic both remain nominally normal to local portions of the optical path between them. The common optical alignment between the image generator and the selectively reflective powered optic reduces issues of image distortion and chromatic aberration, largely by maintaining rotational symmetry.

In addition, the folded light path to the selectively reflective powered optic allows the image generator or its relayed image to be inclined (i.e., effectively inclined) to a thickness direction of the near-eye display along the line of sight. The inclined orientation of the image generator or its relayed image enables the construction of a thinner, i.e., more compact, near-eye display.

One version of a near-eye display in accordance with the invention projects virtual images from an image generator to an eyebox within which the virtual images can be seen by a viewer. A selectively reflective powered optic connects first and second optical paths. The first optical path conveys image-bearing light from the image generator to the selectively reflective powered optic, and the second optical path conveys the image-bearing light along a line of sight from the selectively reflective powered optic to the eyebox. First and second selectively reflective surfaces fold the first optical path with respect to the second optical path to locate the image generator out of the line of sight to the eyebox. The image generator is effectively inclined to the line of sight to the eyebox for reducing a thickness of the near-eye display, and the selectively reflective powered optic is oriented nominally normal to local overlapping portions of the first and second optical paths at the selectively reflective powered optic for reducing image distortion.

Preferably, the image generator is also oriented nominally normal to a local portion of the first optical path at the image generator for reducing image distortion. The first selectively reflective surface and the selectively reflective powered optic have optical axes preferably oriented substantially parallel to the line of sight along the second optical path. The second selectively reflective surface has an optical axis preferably oriented with respect to the axis of the first selectively reflective surface through an angle of less than 45 degrees and more preferably between 25 degrees and 35 degrees.

The selectively reflective powered optic is preferably a holographic optic arranged for focusing the image-bearing light within the eyebox and transmitting ambient light along the line of sight to the eyebox. The second selectively reflective surface preferably includes a polarization-sensitive beamsplitter, and a polarization modifier is preferably located between the first selectively reflective surface and the selectively reflective powered optic. The first and second selectively reflective surfaces are preferably unpowered optical surfaces.

Another version of a near-eye display for projecting virtual images from an image generator to an eyebox within which the virtual images can be seen by a viewer includes a selectively reflective powered optic connecting first and second effectively parallel optical paths (i.e., paths that would be parallel if unfolded from reflection). The first optical path conveys image-bearing light from the image generator to the selectively reflective powered optic, and the second optical path conveys the image-bearing light from the selectively reflective powered optic to the eyebox. First and second selectively reflective surfaces each encounter the image-bearing light along the first and second optical paths. The first selectively reflective surface conveys the image-bearing light from the image generator to the second selectively reflective optic and from the second selectively reflective optic to the selectively reflective powered optic along the first optical path. In addition, the first selectively reflective surface conveys the image-bearing light from the selectively reflective powered optic to the second selectively reflective surface along the second optical path. The second selectively reflective surface conveys the image-bearing light from the first selectively reflective surface back to the first selectively reflective surface along the first optical path and conveys the image-bearing light from the first selectively reflective surface to the eyebox along the second optical path.

Preferably, facets of a prismatic waveguide support the first and second selectively reflective surfaces. An entrance facet of the prismatic waveguide is preferably oriented nominally normal to the first optical path at the entrance facet. The first selectively reflective surface preferably reflects the image-bearing light within the prismatic waveguide by a mechanism of total internal reflection.

For viewing the ambient environment along the second optical path, a supplemental prism can be provided with an adjoining facet adjacent to the second selectively reflective surface and an inner face facet oriented parallel to the first selectively reflective surface. Preferably, the selectively reflective powered optic, the first selectively reflective surface supported by the prismatic waveguide, and the inner face facet of the supplemental prism all have optical axes oriented parallel to the second optical path to the eyebox.

A version of a compound display and imaging device in accordance with the invention for both displaying virtual images from within an eyebox and for imaging external views from a perspective of the eyebox includes a camera, a selectively reflective powered optic, and first and second selectively reflective surfaces. The selectively reflective powered optic projects virtual images from an image generator along a display optical pathway to an eyebox having a field of view within which the virtual images are visible. The first and second selectively reflective surfaces each convey display light along the display pathway from the image generator to the selectively reflective powered optic and from the selectively reflective powered optic to the eyebox. The camera images the external views along an image pathway through the selectively reflective powered optic. The first and second selectively reflective surfaces each convey image light along the image pathway from the selectively reflective powered optic to the camera. The image pathway between the second selectively reflective optic and the selectively reflective powered optic is aligned with the display pathway between the selectively reflective powered optic and the eyebox so that the external views imaged by the camera are aligned with the virtual images that are visible from within the eyebox.

Preferably, a see-through pathway is aligned with both (a) the image pathway between the second selectively reflective optic and the selectively reflective powered optic and (b) the display pathway between the selectively reflective powered optic and the eyebox so that external views apparent from within the eyebox correspond to the external views that are imaged by the camera. The first selectively reflective optic preferably conveys display light along the display pathway to the second selectively reflective optic by one of reflection or transmission and preferably conveys image light along the image pathway to the second selectively reflective optic by the other of the reflection or transmission. The second selectively reflective optic preferably conveys both (a) the display light along the display pathway to the selectively reflective powered optic and (b) the image light along the image pathway from the selectively reflective powered optic.

A prismatic waveguide assembly within the compound display and imaging device preferably includes a display entrance facet along the display pathway and an image entrance facet along the image pathway. The first and second selectively reflective surfaces are preferably supported on facets of the prismatic waveguide assembly that are relatively inclined through an angle of less than 45 degrees and more preferably between 25 degrees and 35 degrees. An inner supplemental prism of the prismatic waveguide assembly preferably includes an adjoining facet adjacent to the second selectively reflective surface and an inner face facet oriented parallel to the first selectively reflective surface. An outer supplemental prism of the prismatic waveguide assembly preferably includes an adjoining facet adjacent to the selectively reflective powered optic and an outer face facet oriented parallel to the inner face facet.

The second selectively reflective surface is preferably a polarization-sensitive beamsplitter that reflects one orientation of polarized light and transmits another orientation of polarized light. For example, the polarization-sensitive beamsplitter can be arranged to reflect the image light from the external view toward the camera, reflect the display light from the image generator toward the selectively reflective powered optic, and transmit the display light from the selectively reflective powered optic toward the eyebox. The camera preferably includes a focusing optic for focusing the external views within the camera, and the selectively reflective powered optic preferably transmits the image light along the image pathway to the camera without contributing focusing power.

A version of near-eye augmented reality device in accordance with the invention includes both a camera and a selectively reflective powered optic. The selectively reflective powered optic projects virtual images from an image generator along a display optical pathway to an eyebox having a field of view within which the virtual images are visible. The camera images external views along an image pathway through the selectively reflective powered optic. A see-through pathway extends through the selectively reflective powered optic to the eyebox for transmitting the external views to the eyebox. A portion of the image pathway through the selectively reflective powered optic is aligned with a portion of the display pathway between the selectively reflective powered optic and the eyebox so that the external views imaged by the camera are aligned with the virtual images that are visible from within the eyebox. A portion of the image pathway through the selectively reflective powered optic is aligned with the see-through pathway to the eyebox so that the external views apparent from within the eyebox correspond to the external views that are imaged by the camera.

BRIEF DESCRIPTION OF THE DRAWING FIGURES

DETAILED DESCRIPTION OF THE INVENTION

Figure 1:
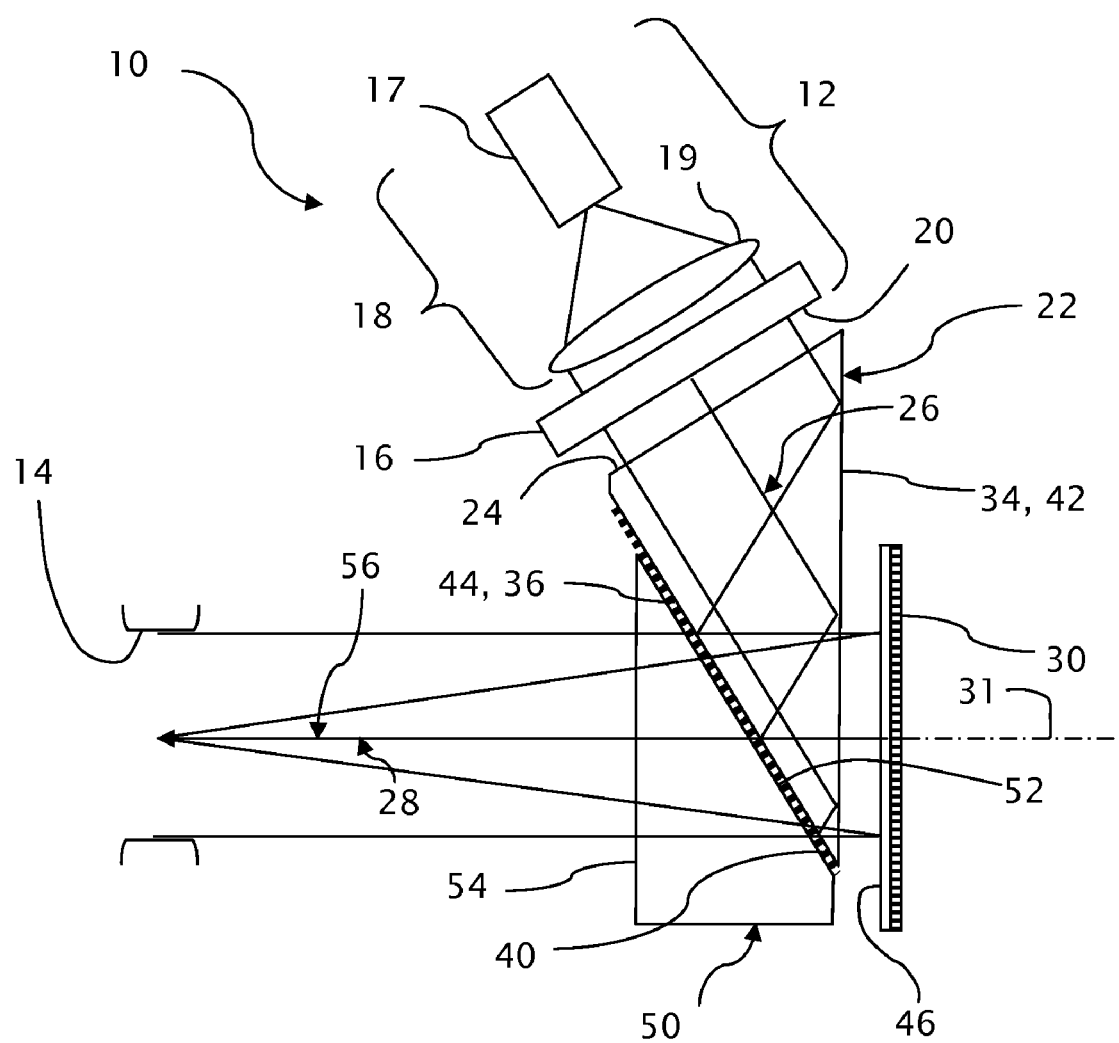
FIG. 1 is a diagrammatic top view of a near-eye display in accordance with the invention.

A near-eye display 10, as depicted in FIG. 1, includes an image generator 12 for producing a succession of images, such as video images, that are projected as virtual images into an eyebox 14. The image generator 12, which can take a number of forms, preferably combines a spatial light modulator 16 with an illuminator 18 that uniformly illuminates the spatial light modulator 16. The illuminator 18 preferably includes a light source 17, which can be formed by one or more light emitting diodes or other known sources including lamps, and a condenser 19 that collects light from the source 17 and evenly illuminates the spatial light modulator 16. Light patterns are produced within the spatial light modulator 16 by differentially propagating light on a pixel-by-pixel basis in accordance with a video input signal from a video source (not shown). For example, the spatial light modulator 16 can comprise a controllable array of liquid crystal diodes functioning as individually addressable pixels for producing desired light patterns in response to the video signal. Other spatial light modulators useful for purposes of the invention include grating light valve (GLV) technologies and digital light processing (DLP) technologies such as digital micromirror devices (DMDs). The spatial light modulator 16 and illuminator 18 can be replaced by self-illuminating image generators in which the addressable pixel elements are themselves individually controllable light sources, such as organic light-emitting diode (OLED) technologies.

Within the near-eye display 10, the output of the image generator 12 is effectively located within an object plane 20, which is intended to be projected as a magnified virtual image within the eyebox 14. Light emitted from the image generator 12 enters a prismatic waveguide 22 through an entrance facet 24 that is oriented in parallel with the object plane 20 so that chief rays from the object plane 20 or at least the paraxial rays encounter the entrance facet 24 at near normal incidence.

Light emitted from the image generator 12 propagates along a first optical path 26 through the prismatic waveguide 22 to a selectively reflective powered optic 30, which focuses the light from the image generator 12 by reflection along a second effectively parallel optical path 28 through the prismatic waveguide 22 to the eyebox 14. The focal power of the selectively reflective powered optic 30 projects a magnified virtual image of the object plane 20, which is viewable from within the eyebox 14. The selectively reflective powered optic 30 is oriented substantially normal to local portions of first and second optical paths 26 and 28, i.e., the optical axis 31 of the selectively reflective powered optic 30 is aligned with the first and second optical paths 26 and 28 along their opposing directions of incidence and reflection at the selectively reflective powered optic.

Preferably, the selectively reflective powered optic 30 is formed as a reflective volume hologram arranged for focusing selected wavelengths of light. The selected wavelengths preferably correspond to a red-green-blue (RGB) color combination output by the image generator 12. Image-bearing light in the selected colors is reflected and focused along the second optical path 28. The remaining wavelengths of visible light, which include other wavelengths red, green, and blue light beyond the coherent bands over which the volume hologram is formed, transmit through the volume hologram largely undisturbed.

Before reaching the selectively reflective powered optic 30 along the first optical path 26, first and second selectively reflective surfaces 34 and 36 fold image-bearing light from the image generator 12 out of physical alignment with the eyebox 14. Except for the two reflections at the selectively reflective surfaces 34 and 36, which do not appreciably alter or otherwise distort the wavefront shape of the image-bearing light, the first and second optical paths 26 and 28 remain effectively optically aligned. In other words, if the first optical path 26 were to be physically unfolded, the first optical path from the image generator 12 to the selectively reflective powered optic 30 would overlie the second optical path 28 from the selectively reflective powered optic 30 to the eyebox 14. Since the object plane 20 lies substantially normal to the first optical path 26 and the first and second optical paths 34 and 36 are effectively optically aligned with one another, the virtual image is formed without distortion or any requirement for correcting distortion along either of the two optical paths 26 and 28.

The first and second selectively reflective surfaces 34 and 36 are supported by or otherwise formed by facets 42 and 44 of the prismatic waveguide 22. The first selectively reflective surface 34 is formed on or by the facet 42 and exhibits selective reflectivity by the mechanism of total internal reflection (TIR), which exploits a difference between the refractive index of the prismatic waveguide 22 and the refractive index of the local environment adjacent to the facet 42. Coatings or other modifications to the facet 42 can be used to influence the reflective properties of the first selectively reflective surface 34. Preferably light from the image generator 12 first encounters the first selectively reflective surface 34 along the first optical path 26 at angles of incidence greater than the critical angle above which the light is totally internally reflected.

The second selectively reflective surface 36 is preferably fashioned as a polarization-sensitive beamsplitter 40 supported on the facet 44 of the prismatic waveguide 22. At least a portion of the image-bearing light from the image generator 12 last reflected from the first selectively reflective surface 34 is further reflected by the second selectively reflective surface 36 along the first optical path 26 through the first selectively reflective surface 34 to the selectively reflective powered optic 30. En route top the selectively reflective powered optic 30 the image-bearing light encounters both the first selectively reflective surface 34 and a polarization modifier 46 at a nominal normal incidence. The near zero incidence angle at which the image-bearing light encounters the first selectively reflective surface 34 is well below the critical angle required to support total internal reflection within the prismatic waveguide 22. So, while the first encounter of the image-bearing light with the first selectively reflective surface 34 along the first optical path 26 is reflective, the second encounter of the image-bearing light with the first selectively reflective surface 34 is along the first optical path 26 is transmissive.

Instead of exploiting the mechanism of total internal reflection (TIR) to support the function of selective reflectivity, the second selectively reflective surface 36 in the form of the polarization-sensitive beamsplitter 40 exploits the mechanism of polarization to support the function of selective reflectivity. The light emitted from the image generator 12 can be at least partially polarized, especially if a liquid crystal array is used in combination with orthogonal polarizers as the spatial light modulator 16. The second selectively reflective surface 36 as a polarization-sensitive beamsplitter is preferably arranged to reflect the polarization orientation of the image-bearing light from the image generator 12 and to transmit an orthogonal orientation of polarization.

The polarization modifier 46, which is spaced from the first selectively reflective surface 34 to preserve an air gap 48 or other low-reflectivity medium required for sustaining total internal reflection (TIR), modifies the polarization of the image bearing light by relatively retarding one orthogonal polarization component with respect to another through approximately $\pi/2$ radians. After being both reflected and focused by the selectively reflective powered optic 30, the image-bearing light propagates along the second optical path 28 through both the polarization modifier 46 and the first selectively reflective surface 34 to the second selectively reflective surface 36. Since the optical axis 31 of the selectively reflective powered optic 30 is aligned with local portions of the first and second optical paths 26 and 28, the focused image-bearing light reflected from the selectively reflective powered optic 30 transmits through both the polarization modifier 46 and the first selectively reflective surface 34 at near normal incidence and well below the critical angle for TIR. The second encounter of the image-bearing light with the polarization modifier 46 relatively modifies the orthogonal polarization components of the image-bearing light by another $\pi/2$ radians, so the total modification from both encounters orthogonally transforms the polarization of the image-bearing light. A one-quarter wave plate retarder is preferably used to perform the two-step polarization modification. The focused image-bearing light propagating along the second optical path 28 transmits through the second selectively reflective surface 36 (i.e., the polarization-sensitive beamsplitter 40) as orthogonally rotated polarized light en route to the eyebox 14.

While the entrance facet 24 is substantially normal to the local portion of the first optical path 26 to minimize chromatically sensitive refractive effects, the facet 44, on which the second selectively reflective surface 36 is formed as the polarization-sensitive beamsplitter 40 and through which the second optical path 28 exits the prismatic waveguide 22, is not substantially normal to the second optical path 28. Instead, the second selectively reflective surface 36 is inclined to the first selectively reflective surface 34 through an acute angle that is preferably less than 45 degrees and more preferably between 25 degrees and 35 degrees. At 30 degrees, image bearing light entering the prismatic waveguide 22 propagates parallel to the second selectively reflective surface 36 (i.e., the facet 44) en route to the first selectively reflective surface 34 (i.e., the facet 42) for efficiently filling the prismatic waveguide 22.

A supplemental prism 50 having an adjoining facet 52 mated to the polarization-sensitive beamsplitter on the selectively reflective surface 36 on the facet 44 of the prismatic waveguide 22 and having an exit facet 54 parallel to the selective reflective surface 32 on the facet 42 of the prismatic waveguide minimizes chromatically sensitive refractive effects on the image bearing light propagating toward the eyebox 14. The minimized prismatic refraction also avoids a shift in the viewing position of the projected virtual image within the eyebox 14. To this end, the refractive index of the supplemental prism 50 preferably matches the refractive index of the prismatic waveguide 22.

The mating prisms, i.e., the prismatic waveguide 22 and the supplemental prism 50, function together as a single plane parallel plate with respect to a see-through pathway 56 in alignment with the second optical path 28. However, the supplemental prism 50 and the prismatic waveguide 22 are preferably mated together in an offset position so that their combined thickness as a plane parallel plate along the second optical pathway 28 and the see-through pathway 56 is less than the sum of their individual thicknesses. The offset between the prismatic waveguide 22 and the supplemental prism 50 allows the entrance facet 24 to be sized independently of the combined thicknesses of the prismatic waveguide 22 and the supplemental prism 50 plate in front of a viewer's eye.

Ambient light enters the near eye display 10 through the selectively reflective powered optic 30, preferably in the form of a volume hologram, and propagates along the see-through pathway 56 through the polarization modifier 46 and the mating prisms 22 and 50 and into the eyebox 14 in alignment with the image-bearing light focused into the eyebox by the selectively reflective powered optic 30. The polarization-sensitive beamsplitter located between the mating prisms 22 and 50 reflects a portion of the ambient light, preferably so-called "S-polarized" light, which is prone to reflections off ground oriented surfaces. Thus, the near-eye display 10 functions similar to polarized sunglasses with respect to ambient light while also projecting virtual images from the image generator 12 that are visible within the eyebox 14.

Figure 2:
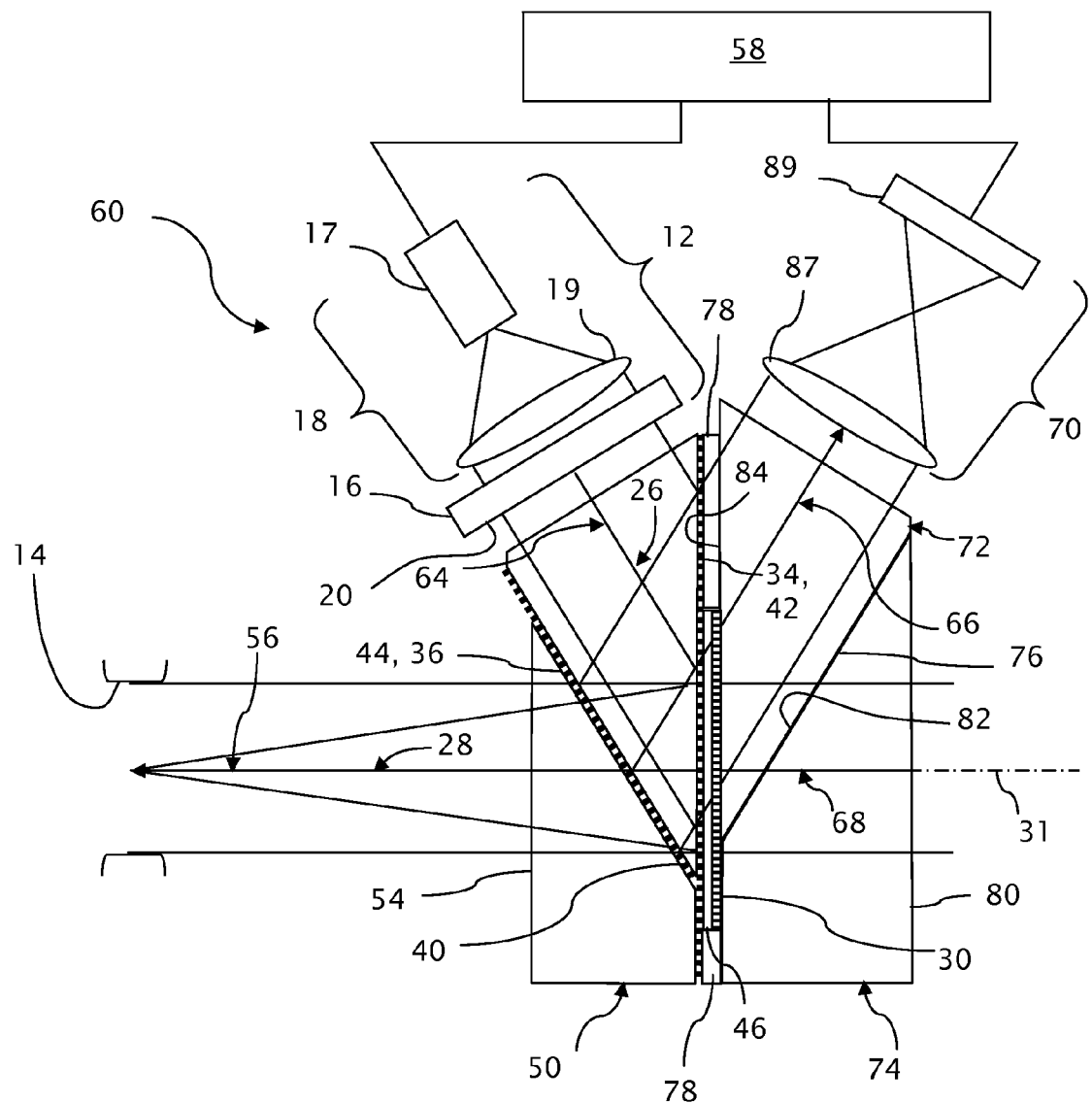
FIG. 2 is a diagrammatic top view of a compound display and imaging device 60 in accordance with the invention.

A compound display and imaging device 60 for displaying virtual images from within an eyebox 14 and for imaging external views from a perspective of the eyebox 14 is disclosed in FIG. 2. Together with known software within a processor 58 for processing information imaged from the external views and for incorporating the imaged information in some form, such as computer-generated or computer-modified imagery, into the displayed virtual images, the device 60 can be used as a mediated reality device. For example, the imaged information can be processed for purposes of object recognition and information about the recognized objects can be incorporated into the displayed virtual images. Information can also be gathered from the imaged external views that would not normally be visible to a viewer using the device 60 (e.g., infrared light), processed, and incorporated into the displayed images for enhancing the viewer's view or other sensory appreciation of the external environment.

A display portion of the device 60 is similar to the near-eye display 10 of FIG. 1 except that the selectively reflective surface 34 is rendered selectively reflective by a volume hologram 62 instead of by the mechanism of total internal reflection (TIR). In addition, since no gap is required to sustain TIR, the polarization modifier 46 and the selectively reflective powered optic 30 (e.g., a powered volume hologram) can be moved alongside the volume hologram 62. For sake of simplicity, features of the compound display and imaging device 60 in common with the near-eye display 10 of FIG. 1 share the same reference numerals.

Three optical pathways are defined through the device 60: a display pathway 64, an image pathway 66, and a see-through pathway 68. The display pathway 64 corresponds to the first and second optical paths 26 and 28 through the device 10 for projecting virtual images that are visible within the eyebox 14. The image pathway 66 conveys to a camera 70 external views corresponding at least in part to an ambient view of the along the see-through pathway 68 to the eyebox 14. The see-through pathway 68 corresponds to the see-through pathway 56 of the display 10 but is extended to accommodate additional optics associated with the image pathway 66.

In addition to the structures in common with the display 10, the device 60 includes a prismatic waveguide 72 and a supplemental prism 74. The prismatic waveguide 72 is primarily intended for diminishing refractive effects along the imaging pathway 66 associated with ambient light passing through the first selectively reflective surface 34 on the facet 42 of the prismatic waveguide 22. The supplemental prism 74 is primarily intended for diminishing refractive effects along the combined imaging and see-through pathways 66 and 68 associated with ambient light passing through a facet 76 of the prismatic waveguide 72. Alternatively, the prismatic waveguide 72 and the supplemental prism 74 could be combined into a single prismatic waveguide, particularly since the facet 76 of the prismatic waveguide 72 is not required to perform an independent optical function in the depicted embodiment. An index matching adhesive 78 joins the prismatic waveguide 72 and the supplemental prism 74 to the prismatic waveguide 22 and the supplemental prism 50.

Ambient light along both the imaging pathway 66 and the see-through pathway 68 enters the supplemental prism 74 through an entrance facet 80 and passes through an interface between the facet 76 of the prismatic waveguide 72 and an adjoining facet 82 of the supplemental prism 74. An inner face facet 84 of the prismatic waveguide 72 adjoins the selectively reflective powered optic 30 along at least part of its length and the index matching adhesive 78 couples the remaining common portions of the two prismatic waveguides 22 and 72 and the two supplemental waveguides 50 and 74.

Light exiting the prismatic waveguide 72 along the imaging pathway 66 enters the prismatic waveguide 22 through various interfaces including through a combination of the selectively reflective powered optic 30, particularly as a powered hologram, the polarization modifier 46, and the selectively reflective surface 34, particularly as a angular sensitive reflective hologram and through a combination of the index matching adhesive 78 and the selectively reflective surface 34.

The selectively reflective surface 36, particularly as a polarizations-sensitive beamsplitter 40, reflects a portion of the light along the imaging pathway back through the same interfaces between the prismatic waveguides 22 and 72 en route to the camera 70. Substantially the entire remaining portion of the light is transmitted through the polarization sensitive beamsplitter 40 along the see-through pathway 68 en route to the eyebox 14.

Along the imaging pathway 66, light exits the prismatic waveguide 72 through an exit facet 86 that is oriented normal to the imaging pathway 66. The camera 70, which completes the imaging pathway 66, includes a focusing optic 87 and a detector 89. The focusing optic 87 images views within the ambient environment onto the detector 89, which is located at an imaging plane. The detector 89 is preferably a digital image capturing device such as a charge coupled device (CCD) array. The processor 58 receives image information captured by the camera 70.

Along the see-through pathway 68, ambient light exits the prismatic waveguide 72 through the exit facet 54, which extends parallel with the entrance facet 80. Thus, the device 60 functions largely as a plane-parallel plate along the see-through pathway 68 for avoiding prismatic or other refractive effects, at least with respect to the chief rays (or at least paraxial rays of systems that depart more significantly from telecentricity) transmitted through the device 60. The optical path portion 28 along the display pathway 64 is aligned with and overlaps the see-through pathway 68 within the prismatic waveguide 22 and is aligned with and overlaps the imaging pathway within a portion of the prismatic waveguide 22 between the first selectively reflective surface 34 and the exit facet 54. If unfolded from reflection, all three pathways 64, 66, and 68 would be aligned with each other along a common optical axis and substantially centered within the eyebox 14.

The processor 58, which can have access to additional information in memory or from other sources, such a global positioning system data, processes the digital image information from the camera 70 taken largely along the line of sight of the see-through pathway 68. The processed information is preferably used to generate text or graphics that are reproduced by the image generator 12 for projection as virtual images that can be overlaid onto the viewer's view of the external world along the same line of sight. The text and graphics can overlay or reference particular features that are visible along the see-through pathway 68 or other features that are not visible or are only marginally visible to a viewer. To precisely associate projected virtual images of text or graphics with particular features in the external world, the images received the camera 70 should be optically aligned and scaled to the images reproduced by the image generator 12 and both the images received by the camera 70 and the images reproduced by the image generator 12 should be optically aligned and scaled to the images of the external world that are visible to a viewer along the see-through pathway 68.

Figure 3:
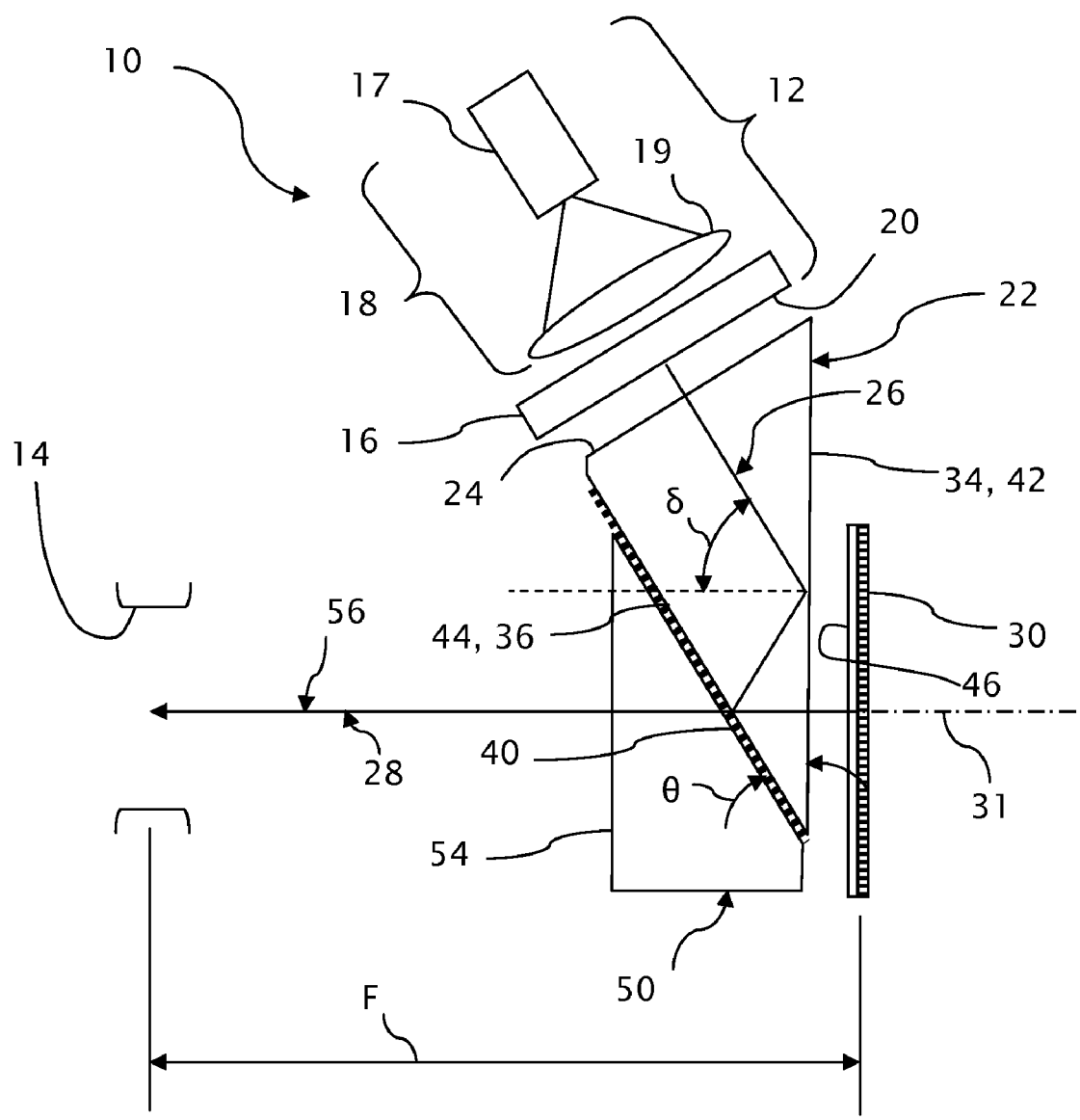
FIG. 3 is a similar diagrammatic top view of the display of FIG. 1 simplified for showing orientations and relationships with respect to paraxial rays propagating through the display.

With reference to FIG. 3 depicting the propagation of paraxial rays through the near-eye display 10 of FIG. 1 and assuming that (a) the first selectively reflective surface 34 is oriented normal to the optical axis 31 of the selectively reflective powered optic 30 and (b) the second selectively reflective surface 36 reflects light (i.e., at least the paraxial rays) along the same optical axis 31, an incidence angle "δ" at which the paraxial rays approach the first selectively reflective surface 34 is equal to two times an angle "θ" at which the second selectively reflective surface 36 is inclined to the first selectively reflective surface 34. As also apparent from FIG. 3, the object plane 20 of the image generator 12 is inclined (i.e., an effective inclination of the image generator 12) with respect to the optical axis 31 of the selectively reflective focusing optic 30 and the see-through pathway 68 through an angle equal to the complement of the incidence angle "δ", which allows the display 10 to be narrower in the direction of the see-through pathway 68. En route to the first selectively reflective surface 34, the inclination of the object plane 20 can reduce the local thickness of the display by the Cosine function of the inclination angle.

The illustrated designs support inclination angles "θ" of less than 45 degrees for limiting the thickness of the devices 10 and 60 along the see-through pathway 68. Preferably, the inclination angles "θ" approach 30 degrees so that the closest chief rays (or at least the paraxial rays) propagate from the image generator 12 toward the first selectively reflective surface 34 nearly parallel to the second selectively reflective surface 36 for efficiently filling the prismatic waveguide 28. Inclination angles of between 25 degrees to 35 degrees are preferred so that the paraxial rays propagate toward a first encounter with the first selectively reflective surface 34 within 15 degrees of the second selectively reflective surface 36.

Within these preferred bounds, accommodations can be made for achieving desired ratios of optical path lengths between the first and second optical paths 26 and 28 in keeping with a focal length "F" of the selectively reflective focusing optic 30 and the desired magnification of the design. Generally, the eyebox 14 is located at approximately one focal length "F" from the selectively reflective focusing optic 30 along the second optical path 28. The image generator 12, or more specifically, the object plane 20 within which the image generator 12 generates an object image, is preferably located at an optical distance along the first optical path 26 to the selectively reflective focusing optic 30 slightly shorter than the focal length "F", so that the virtual image of the object image appears to the viewer from within the eyebox 14 at a distance of approximately three meters.

Although in the preceding FIGS. 1-3, the object plane 20 of the image generator 12 is depicted coincident with a surface of the spatial light modulator 16, the object image produced at the spatial light modulator 16 or other image generating source can be relayed into the position shown by relay optics (not shown). In other words, the image generator 12 can be located remotely, and the object images generated by the image generator 12 can be relayed to a desired position at a predetermined optical path length along the first optical path 26 to the selectively reflective focusing optic 30.

The devices 10 or 60 illustrated above are preferably supported in frames (not shown) for positioning the eyeboxes 14 at or near a wearer's (i.e., viewer's) pupil. Similarly powered devices 10 or 60 can be mounted for presenting virtual images to both of a viewer's eyes. A filter, such as a polarization modifier, can be positioned near an entrance to the see-through pathway 68 to relatively adjust the amount of ambient light reaching the eyebox 14 with respect to the amount of image bearing light from the image generator 12 reaching the eyebox 14. Particularly with respect to the compound display and imaging device 60, the image generator 12 and camera 70 can be arranged interchangeably. For example, image-bearing light propagating along the first optical path 26 can be arranged for transmitting through the first selectively reflective surface 34 en route to the second selectively reflective surface 36, and ambient light reflected from the second selectively reflective surface 36 can be reflected by the first selectively reflective surface 34 en route to the camera 70. These and other modifications, additions, and other changes will be apparent to those of skill in the art in accordance with the overall teaching of this invention.

The invention claimed is:

1. A near-eye display for projecting virtual images from an image generator to an eyebox within which the virtual images can be seen by a viewer comprising
a selectively reflective powered optic connecting first and second optical paths, the first optical path providing for conveying image-bearing light from the image generator to the selectively reflective powered optic and the second optical path providing for conveying the image-bearing light along a line of sight from the selectively reflective powered optic to the eyebox,
first and second selectively reflective surfaces folding the first optical path with respect to the second optical path to locate the image generator out of the line of sight to the eyebox,
the image generator being effectively inclined to the line of sight to the eyebox for reducing a thickness of the near-eye display, and
the selectively reflective powered optic being oriented normal to local overlapping portions of the first and second optical paths at the selectively reflective powered optic.

2. The near-eye display of claim 1 in which the image generator is oriented normal to a local portion of the first optical path at the image generator.

3. The near-eye display of claim 2 in which the first selectively reflective surface and the selectively reflective powered optic have optical axes oriented substantially parallel to the line of sight along the second optical path and the second selectively reflective surface has an optical axis oriented with respect to the axis of the first selectively reflective surface through an angle of less than 45 degrees.

4. The near-eye display of claim 3 in which the second selectively reflective surface is oriented with respect to the first selectively reflective surface through an angle between 25 degrees and 35 degrees.

5. The near-eye display of claim 1 in which the image generator or a relayed image of the image generator is inclined to the line of sight to the eyebox.

6. The near-eye display of claim 1 in which the first selectively reflective surface conveys the image-bearing light by at least one of reflection and transmission at different points along the first optical path from the image generator to the selectively reflective powered optic and conveys image-bearing light by transmission along the second optical path from the selectively reflective powered optic to the eyebox.

7. The near-eye display of claim 6 in which the second selectively reflective surface that conveys the image-bearing light by reflection along the first optical path from the image generator to the selectively reflective powered optic and by transmission along the second optical path from the selectively reflective powered optic to the eyebox.

8. The near-eye display of claim 1 in which the selectively reflective powered optic is a holographic optic arranged for focusing the image-bearing light and transmitting ambient light along the line of sight to the eyebox.

9. The near-eye display of claim 8 in which the second selectively reflective surface includes a polarization-sensitive beamsplitter and a polarization modifier is located between the first selectively reflective surface and the selectively reflective powered optic.

10. The near-eye display of claim 9 in which the first and second selectively reflective surfaces are unpowered optical surfaces.

11. A near-eye display for projecting virtual images from an image generator to an eyebox within which the virtual images can be seen by a viewer comprising
a selectively reflective powered optic connecting first and second effectively parallel optical paths, the first optical path providing for conveying image-bearing light from the image generator to the selectively reflective powered optic and the second optical path providing for conveying the image-bearing light from the selectively reflective powered optic to the eyebox,
first and second selectively reflective surfaces each encountering the image-bearing light along the first and second optical paths,
the first selectively reflective surface providing for conveying the image-bearing light from the image generator to the second selectively reflective optic and from the second selectively reflective optic to the selectively reflective powered optic along the first optical path and providing for conveying the image-bearing light from the selectively reflective powered optic to the second selectively reflective surface along the second optical path, and
the second selectively reflective surface providing for conveying the image-bearing light from the first selectively reflective surface back to the first selectively reflective surface along the first optical path and providing for conveying the image-bearing light from the first selectively reflective surface to the eyebox along the second optical path.

12. The near-eye display of claim 11 in which the selectively reflective powered optic and the first selectively reflective surface have optical axes oriented substantially parallel to the second optical path.

13. The near-eye display of claim 12 in which the second selectively reflective surface also has an optical axis and the optical axes of the first and second selectively reflective surfaces are relatively inclined by an angle of less than 45 degrees.

14. The near-eye display of claim 13 in which the second selectively reflective surface is oriented with respect to the first selectively reflective surface through an angle between 25 degrees and 35 degrees.

15. The near-eye display of claim 11 in which the first and second selectively reflective surfaces are supported by facets of a prismatic waveguide that also includes an entrance facet along the first optical path from the image generator oriented substantially normal to the first optical path at the entrance facet.

16. The near-eye display of claim 15 in which the first selectively reflective surface reflects the image-bearing light within the prismatic waveguide by a mechanism of total internal reflection.

17. The near-eye display of claim 15 further comprising a supplemental prism having an adjoining facet adjacent to the second selectively reflective surface and an exit facet oriented parallel to the first selectively reflective surface.

18. The near-eye display of claim 17 in which the selectively reflective powered optic, the first selectively reflective surface supported by the prismatic waveguide, and the exit facet of the supplemental prism all have optical axes oriented parallel to the second optical path to the eyebox.

19. The near-eye display of claim 18 in which a see-through optical path is located in parallel with the second optical path for conveying ambient light through the selectively reflective powered optic, the first and second selectively reflective surfaces supported by the prismatic waveguide, and through the entrance and exit facets of the supplemental prism to the eyebox.

20. The near-eye display of claim 11 in which the selectively reflective powered optic is a reflective powered hologram.

21. The near-eye display of claim 20 in which the first selectively reflective surface is a reflective unpowered hologram.

22. The near-eye display of claim 11 in which a see-through optical path is located in parallel with the second optical path for conveying ambient light through the selectively reflective powered optic and the first and second selectively reflective surfaces to the eyebox.

23. The near-eye display of claim 11 in which the first selectively reflective surface provides for conveying the image-bearing light (a) by reflection along the first optical path from the image generator to the second selectively reflective surface, (b) by transmission along the first optical path from the second selectively reflective surface to the selectively reflective powered optic, and (c) by transmission along the second optical path from the selectively reflective powered optic to the second selectively reflective surface.

24. The near-eye display of claim 23 in which the second selectively reflective surface provides for conveying the image-bearing light (a) by reflection along the first optical path from the first selectively reflective surface back to the first selectively reflective surface and (b) by transmission along the second optical path from the first selectively reflective surface to the eyebox.

25. A compound display and imaging device for displaying virtual images from within an eyebox and for imaging external views from a perspective of the eyebox comprising
a camera, a selectively reflective powered optic, and first and second selectively reflective surfaces,
the selectively reflective powered optic providing for projecting virtual images from an image generator along a display optical pathway to an eyebox having a field of view within which the virtual images are visible,
the first and second selectively reflective surfaces each providing for conveying display light along the display pathway from the image generator to the selectively reflective powered optic and from the selectively reflective powered optic to the eyebox,
the camera providing for imaging the external views along an image pathway through the selectively reflective powered optic,
the first and second selectively reflective surfaces each providing for conveying image light along the image pathway from the selectively reflective powered optic to the camera, and
the image pathway between the second selectively reflective optic and the selectively reflective powered optic being aligned with the display pathway between the selectively reflective powered optic and the eyebox so that the external views imaged by the camera are aligned with the virtual images that are visible from within the eyebox.

26. The compound display and imaging device of claim 25 in which a see-through pathway is aligned with both (a) the image pathway between the second selectively reflective optic and the selectively reflective powered optic and (b) the display pathway between the selectively reflective powered optic and the eyebox so that external views apparent from within the eyebox correspond to the external views that are imaged by the camera.

27. The compound display and imaging device of claim 25 in which the first selectively reflective optic conveys display light along the display pathway to the second selectively reflective optic by one of reflection or transmission and conveys image light along the image pathway to the second selectively reflective optic by the other of the reflection or transmission.

28. The compound display and imaging device of claim 27 in which the second selectively reflective optic conveys both (a) the display light along the display pathway to the selectively reflective powered optic and (b) the image light along the image pathway from the selectively reflective powered optic.

29. The compound display and imaging device of claim 25 further comprising a prismatic waveguide assembly including a display entrance facet along the display pathway and an image entrance facet along the image pathway.

30. The compound display and imaging device of claim 29 in which the first and second selectively reflective surfaces are supported on facets of the prismatic waveguide assembly that are relatively inclined through an angle of less than 45 degrees.

31. The compound display and imaging device of claim 30 in which the prismatic waveguide assembly includes an inner supplemental prism having an adjoining facet adjacent to the second selectively reflective surface and an inner face facet oriented parallel to the first selectively reflective surface.

32. The compound display and imaging device of claim 31 in which the prismatic waveguide assembly includes an outer supplemental prism having an adjoining facet adjacent to the selectively reflective powered optic and an outer face facet oriented parallel to the inner face facet.

33. The compound display and imaging device of claim 25 in which the second selectively reflective surface is a polarization-sensitive beamsplitter that reflects one orientation of polarized light and transmits another orientation of polarized light.

34. The compound display and imaging device of claim 33 in which the polarization-sensitive beamsplitter reflects the image light from the external view toward the camera, reflects the display light from the image generator toward the selectively reflective powered optic, and transmits the display light from the selectively reflective powered optic toward the eyebox.

35. The compound display and imaging device of claim 34 further comprising a polarization modifier for changing the orientation of the polarized light located between the first selectively reflective surface and the selectively reflective powered optic.

36. The compound display and imaging device of claim 25 in which the camera includes a focusing optic for focusing the external views within the camera, and the selectively reflective powered optic transmits the image light along the image pathway to the camera without contributing focusing power.

37. A near-eye augmented reality device comprising
an image generator, a camera, and a selectively reflective powered optic,
the selectively reflective powered optic providing for projecting virtual images from the image generator along a display optical pathway to an eyebox having a field of view within which the virtual images are visible,
the camera providing for imaging external views along an image pathway through the selectively reflective powered optic,
a see-through pathway extending through the selectively reflective powered optic to the eyebox for transmitting the external views to the eyebox,
a portion of the image pathway through the selectively reflective powered optic being aligned with a portion of the display pathway between the selectively reflective powered optic and the eyebox so that the external views imaged by the camera are aligned with the virtual images that are visible from within the eyebox, and a portion of the image pathway through the selectively reflective powered optic being aligned with the see-through pathway to the eyebox so that the external views apparent from within the eyebox correspond to the external views that are imaged by the camera.

38. The device of claim 37 further comprising a first selectively reflective surface that reflects light along one of the image pathway and the display pathway and transmits light along the other of the image pathway and the display pathway for directing light to the camera along the image pathway and directing light from the image generator along the display pathway.

39. The device of claim 38 further comprising a second selectively reflective surface that reflects light along one of the image pathway and the see-through pathway and transmits light along the other of the image pathway and the see-through pathway for directing light to the camera along the image pathway and directing light to the eyebox along the see-through pathway.

40. The device of claim 39 in which light from the image generator twice encounters the first selectively reflective optic en route to the eyebox and light from the external views twice encounters the first selectively reflective optic en route to the camera.

* * * * *